April 18, 1950  W. B. MONTGOMERY ET AL  2,504,215
CATALYST CHAMBER
Filed Jan. 5, 1944  3 Sheets-Sheet 2

INVENTORS
WALTER B. MONTGOMERY
FRANCIS RAPASKY
BY E. F. Liebrecht
Edmond F. Shanahan
ATTORNEYS

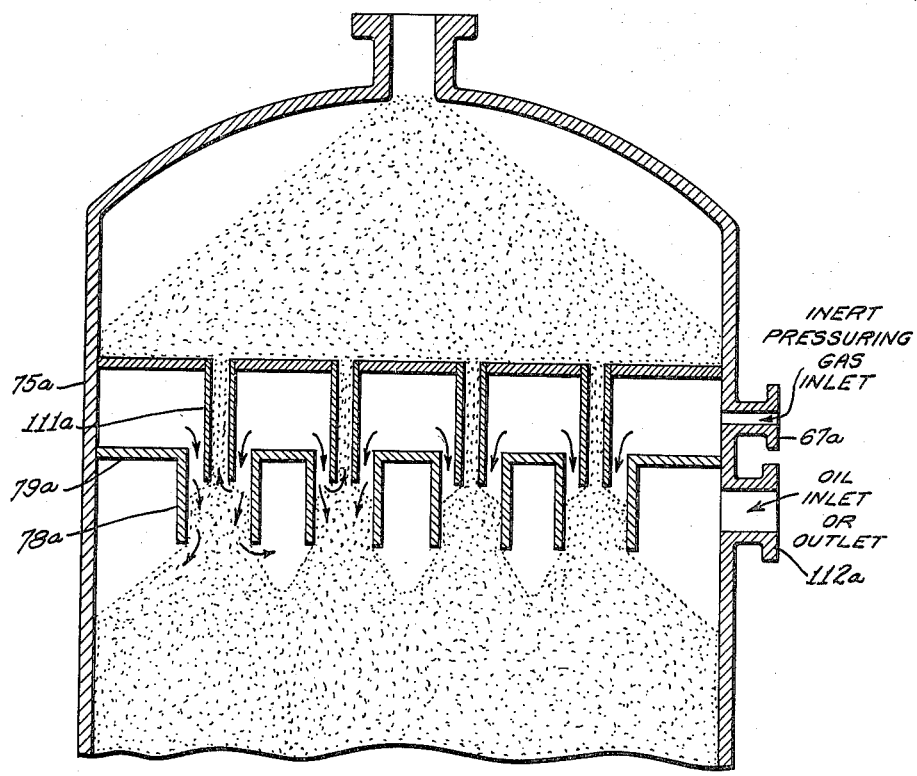

Patented Apr. 18, 1950

2,504,215

UNITED STATES PATENT OFFICE 2,504,215

CATALYST CHAMBER

Walter B. Montgomery, Summit, and Francis Rapasky, Linden, N. J., assignors to The M. W. Kellogg Company, Jersey City, N. J., a corporation of Delaware Application January 5, 1944, Serial No. 517,140

5 Claims. (Cl. 23—288)

Our invention relates to a method and apparatus for catalytic cracking or other hydrocarbon conversion reactions and more particularly to an improved method and apparatus for effecting such reactions with the aid of a catalyst which is continuously supplied to the reactants and continuously removed from the reaction zone.

We contemplate flowing catalyst material in finely divided form through the catalyst chamber in contact with the reactant and our invention relates to a catalyst chamber adapted to continuously supply fresh catalytic material to the reactants and continuously remove spent catalyst material therefrom. While our chamber may be used for any catalytic reaction, we will describe it with respect to the catalytic cracking of hydrocarbon oils, by way of example and not by way of limitation.

One object of our invention is to provide a catalyst chamber to which fresh catalyst material is constantly being supplied and from which spent catalyst material is constantly being removed.

Another object of our invention is to provide a catalyst chamber in which means are provided for controlling the rate of flow of the catalyst material through the chamber, and for reducing powdering of the granular catalyst due to attrition during its flow.

Another object of our invention is to provide a catalyst chamber provided with means for continuously replacing the catalyst in which a uniformity of flow through all of the effective parts of the chamber is maintained.

Another object of our invention is the provision of a method and means whereby the cracked or otherwise converted vapors may be readily withdrawn from the catalyst-contacting chamber separately from the circulated catalyst.

Another object of our invention is the provision of a method and means for confining the vapors to the required path of travel through the catalyst chamber and the prevention of their escape through the catalyst inlet and outlet openings.

Other and further objects of our invention will appear from the following description.

In the accompanying drawings which form part of the instant specification and are to be read in conjunction therewith and in which like reference numerals are used to indicate like parts in the various views:

Figure 8 is a sectional view of a further modification.

Figure 1:
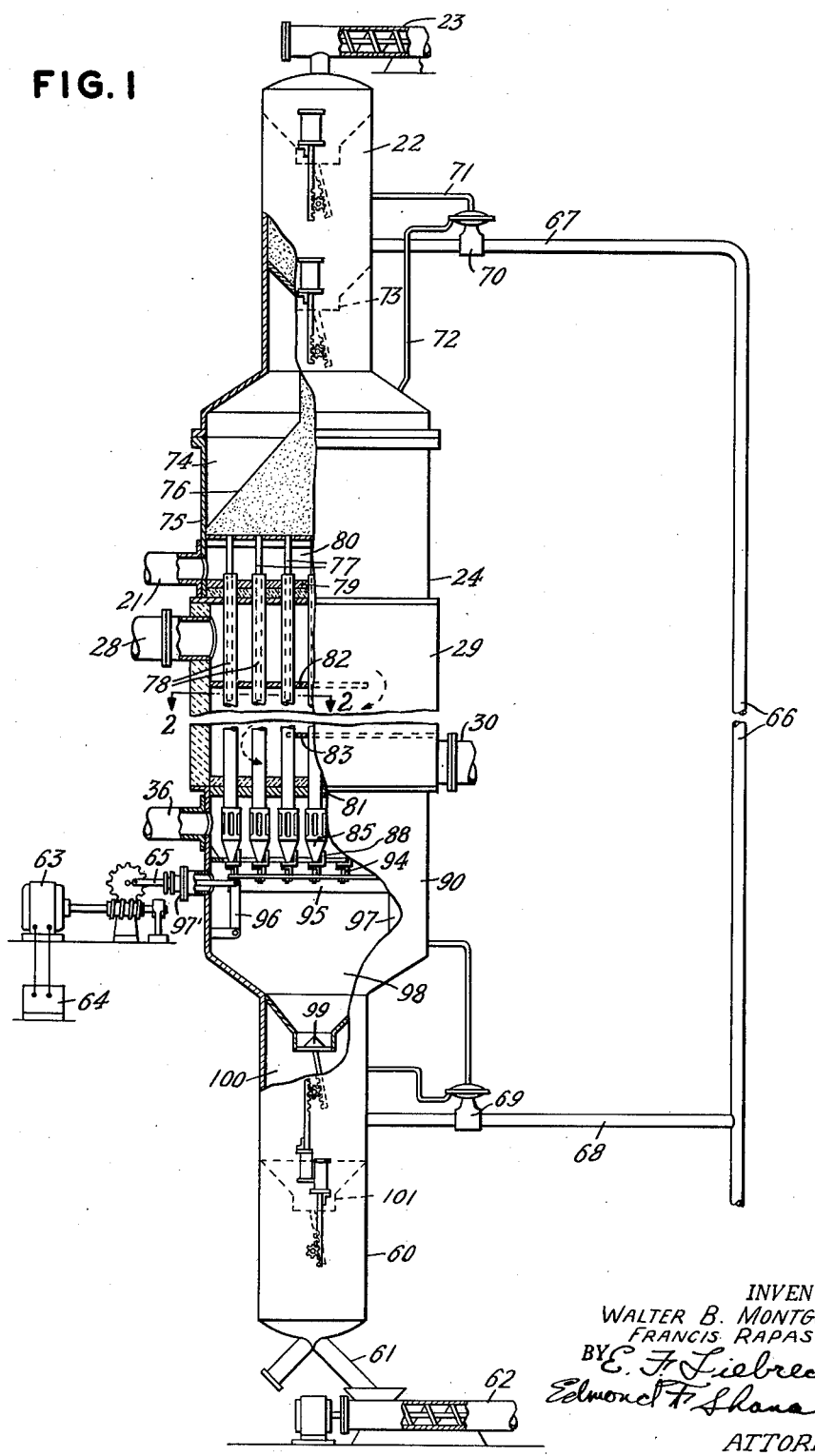
Figure 1 is a sectional view of a catalytic cracking chamber constituting one embodiment of the apparatus of our invention.
Figure 2:
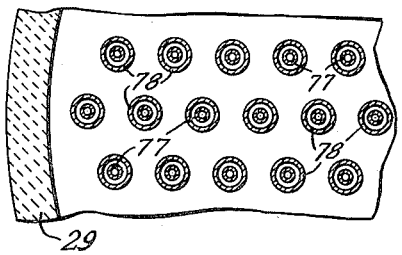
Figure 2 is a fragmentary sectional view taken on a line 2—2 of Figure 1.
Figure 5:
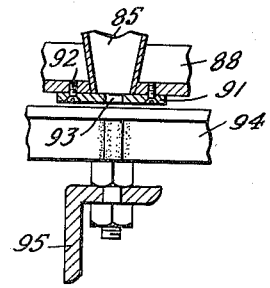
Figure 5 is a sectional view on an enlarged scale, taken on a line 5—5 of Figure 3.

In general, our invention contemplates an apparatus for effecting catalytic hydrocarbon conversions wherein the hydrocarbon vapors to be cracked are passed through tubes containing a cracking catalyst in finely divided or granular form.

Any suitable catalyst may be employed. For catalytic cracking, we prefer to use a granular silica catalyst on which there has been hydrolytically adsorbed a small amount of aluminum oxide. The catalyst is preferably employed in the form of fairly uniform sized particles or granules, for example, particles passing a 6 mesh screen and retained on a 40 mesh screen.

Referring now to the drawings, the hydrocarbons to be cracked or otherwise converted are heated and vaporized and supplied to the reaction chamber through inlet pipe 21. For cracking, the inlet temperature of the vapors may be between about 800° F. and 950° F.

Fresh, finely divided or granular catalyst from any suitable source is passed into a hopper 22 by a conveyor 23 for passage through cracking reaction tubes housed within the reaction chamber 24. The oil fed and discharged to and from reaction chamber 24 may be passed either concurrent or countercurrent to the movement of the catalyst. The arrangement is such that the hot vapors, at cracking temperature, flow upwardly or downwardly through the reaction tubes through the catalyst at a rate sufficient to provide a time interval in which the desired cracking reaction may take place. Inasmuch as cracking is an endothermic reaction, the temperature of the vapors during their passage through the reaction zone is suitably maintained by means of heat exchange. Hot gases of combustion for this purpose pass through a conduit 28 into a jacket 29 in heat exchange with the reaction tubes. The exhaust gases are withdrawn from the hot jacket through duct 30.

It is contemplated to pass the heating medium through the jacket in a countercurrent direction to the reactant vapors, introducing the medium around the lower ends of the catalyst tubes in the location of the pipe 30 and discharging the heating medium through pipe 28.

The cracked vapors are separated from the spent catalytic material and withdrawn from the reaction chamber through pipe 36 and introduced into a conventional fractionating system (not shown).

The spent catalyst passes into the catalyst discharge hoppers 60 from which it is withdrawn through duct 61 for introduction to a conveyor 62 for passage to a catalyst revivifying operation (not shown) in which it may be continuously revivified and returned by conveyor 23, as set forth in the copending application of Keith et al. Serial No. 199,702, filed April 2, 1938, now Patent No. 2,350,730. The flow of catalyst is controlled by a feeding mechanism operated by an electric motor 63 controlled by control mechanism 64. The feeding mechanism reciprocates a shaft 65 which is connected to the flow control arrangement. The vapors to be cracked and the cracked products are prevented from escaping through catalyst introduction hopper 22 and catalyst discharge hopper 60 by means of a sealing fluid such as an inert gas or steam introduced from a sealing fluid main 66 through pipes 67 and 68. Sealing gas is controlled by control valves 69 and 70. The control valves are diaphragm valves controlled by the differential pressure existing within the reaction chamber and in the sealing hoppers. The pressure in the hopper 22 is communicated through pipe 71, the pressure within the reaction chamber being communicated through pipe 72. The arrangement is such that the pressure within the hopper 22 is maintained above that existing within the reaction chamber. A similar arrangement operates the valve 69 at the discharge side of the reaction chamber. The flow of the catalyst is controlled by a valve 73, the catalyst passing into an upper chamber 74 formed within the reaction chamber 24 by a tube sheet 75 which acts as a distributing plate to distribute the catalyst 76 to the feeder tubes 77. The arrangement is such that accumulation of stagnant catalyst adjacent the upper openings of the catalyst tubes 78 is avoided. The feeder tubes 77 extend some distance downwardly into the reaction tubes 78. Below the feeder tube sheet 75 we position a tube sheet 79 in which the catalyst tubes 78 are welded or rolled. The space 80 between the tube sheet 75 and the tube sheet 79 serves as an inlet vapor space to which the incoming hot vapors to be cracked are introduced through pipe 21. The feeder tubes 77 feed the catalyst to the catalyst tubes 78. The length of the feeder tubes will determine the height of the catalyst material maintained within the catalyst tubes. By varying the length of the feeder tubes, the amount of catalyst in the catalyst tubes is determined. This enables us to change the amount of catalyst for cracking various types of stock and employing different types of catalytic material.

The lower portions of the catalyst tubes are welded or rolled in a lower tube sheet 81. A plurality of baffles 82 and 83 are disposed around the exterior of catalyst tubes 78 transversely of the heating jacket 29 to direct the flow of the heating medium which is introduced to the heating jacket through duct 28 and withdrawn therefrom through duct 30. Heat exchange between the heating medium and the reactants within the catalyst tubes supplies heat to the endothermic cracking reaction.

In order to remove the catalyst and the vapors separately from the lower ends of the catalyst tubes, we provide means to effect the separation of the catalyst and the vapors. It will be noted that the catalyst tubes 78 extend beyond the lower tube sheet 81. To these extensions are fitted elements comprising upper cylindrical portions 84 and lower conical portions 85. The cylindrical portions 84 are provided with slots 86, normally covered by screens 87. The screens are made with mesh sufficiently small to permit the discharge of the vapors while preventing the catalyst from passing therethrough.

The tube ends are arranged in rows corresponding with the catalyst tubes to which they are fitted. To facilitate the placing or fitting of the tube ends on the tubes, they are secured to structural members such as angles 88. The angles in turn are supported at their ends by means of a ring 89, carried by the shell 90 of the reaction chamber. Under the discharge end of each cone we secure an orifice plate 91 by means of tapped screws 92 enabling it to be removed for replacement by plates 91 having respective orifices 93 of different sizes. Varying the size of the orifice 93 is a further factor in controlling the rate at which the catalyst material will be discharged from the cone.

The arrangement is such that, in fitting tube ends to the tubes, it is only necessary to position their supporting angles 88 below the tubes so that the tube ends slide easily into the cylindrical portions of the discharge assembly.

A plurality of angles 94 is supported by a cross member 95 and is positioned beneath and adjacent respective lines of orifices 93. The cross member 95 is pivotally supported on links 96 and 97 as can readily be seen by reference to Figure 1. The reciprocating rod 65, driven as indicated hereinabove, passes through a stuffing box 97′ and is adapted to actuate the gridwork formed by cross members 95 and angles 94. The reciprocation of the grid alternately moves the angles clear of the respective orifices 93 and to a position blocking the same. When the grid is clear of the orifices, catalyst material will flow from the discharge cones 85 to the space 98 beneath the discharge arrangement. From the space 98 the catalyst material passes by valve 99 into the sealing hopper 100 from which it is discharged past valve 101. The sealing gas for the lower hopper is introduced through pipe 68 controlled by control valve 69 as described hereinabove.

The slots 86 in the base of the discharge cones are made considerably larger in total area than the internal cross sectional area of the tube. As shown, the area of the slot is substantially four times as large as the internal cross sectional area of the tubes. This effects a corresponding decreased velocity in the vapors and enables ready separation of the cracked vapors from the spent catalyst material to be effected. The discharge valves 99 and 101 and the catalyst feeding valve 73 are operated either by electrical or fluid pressure control mechanism in accordance with a time cycle regulated to introduce the catalyst at definite intervals in amounts proportioned according to the rate of catalyst flow from the tubes. A level gauge (not shown) may be employed in an upper feed compartment. A level gauge may also be employed to indicate the amount of catalyst material in a lower discharge compartment. The change in levels of the upper and lower hoppers will serve to indicate the rate of catalyst flow through the catalyst chamber.

Figure 6:
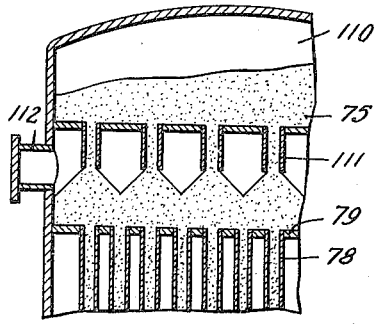
Figure 6 is a sectional view of a modified catalyst feed assembly.
Figure 4:
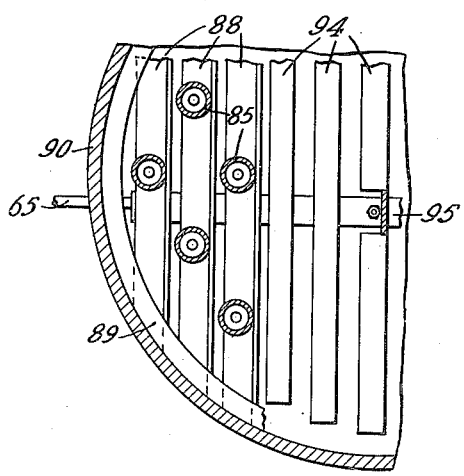
Figure 4 is a sectional view taken on a line 4—4 of Figure 3.

Figure 6 is a sectional view of a modified form of catalyst distribution apparatus. As in Figure 1, the top part of the catalyst chamber is divided by two tube sheets 75 and 79. The portion of the chamber above tube sheet 75 constitutes the catalyst feeding zone 110 corresponding to 74 of Figure 1. Tube sheet 75 is provided with short feeder tubes 111 which may be of lesser number than reaction tubes 78. As the finely divided catalytic material from above tube sheet 75 passes through the tubes 111 it will form a plurality of cones, the base of the cones being of such size that each will cover and feed a number of tubes 78. This insures that a uniform flow of catalytic material will take place through the tubes irrespective of the quantity of catalytic material resting upon tube sheet 75. It is to be understood, of course, that the arrangement may be such that any desired number of tubes 111 may be used to supply any desired number of tubes 78. This feed arrangement may be used to advantage when in effect only a single tube is employed by omitting the individual tubes 78. The object of the arrangement is to prevent packing and to give an even distribution of the catalyst over the top tube sheet or bed of the catalyst if tubes 78 are omitted. A further function of the tubes 111, used instead of a feeding mechanism in the form of a perforated plate to supply catalyst, is to increase the clearance between the catalyst cones and the plate 79 or upper surface of the catalyst bed in order to furnish a larger vapor space facilitating the withdrawal or feeding of vapor through opening 112. The catalytic material will thus flow down each tube 78 at a constant and uniform rate, or when tubes 78 are omitted throughout each portion of the catalyst bed.

Finely divided solids, particularly granular solids, act differently from liquids in their flow characteristics and, if finely divided material is permitted to flow from an orifice on to a flat surface, it will form a cone of material. This cone will have an apex of a certain angle, depending upon the characteristics of the finely divided material. The angle formed by a side of the cone with the plane surface upon which the cone is formed may be called the "angle of repose."

In the arrangement shown in Figure 6, feeding the granular catalyst from the bulk supply thereof supported on the tube sheet 75, through the depending feeder tubes 111 on to the top surface of the moving mass of catalyst in the reaction chamber serves to leave a catalyst-free space above this mass. This space is so extended that it presents comparatively little resistance to the flow of hydrocarbon vapors compared with the resistance of flow through a mass of the granular catalyst. Thus in the arrangement shown in Figure 6, there is a minimized tendency for the hydrocarbons to flow upwardly through the depending tubes 111 (or in the case of Figure 1, upwardly through tubes 77) and suitable conditions are provided for uniform distribution of the vapors over the top surface of, and flow through the moving mass of catalyst. In the case of countercurrent flow, the arrangement shown in Figure 6, has the further function and advantage of effecting a marked decrease in velocity of the vapors as they leave the top surface of the moving mass of catalyst and pass into the catalyst-free space thereabove with consequent minimization of any tendency of the catalyst particles to be carried along with cracked vapors. Also, the "head" of catalyst provided by the catalyst present in tubes 111 and 77 and catalyst in the bulk supply thereabove, will present a corresponding resistance to flow of the pressuring inert gas supplied through line 67, and hence a minimum amount of the inert gas will be forced out of the bottom of tubes 111 incident to the prevention of leakage of the hydrocarbons through the catalyst supply means. A further advantageous modification for the attainment of these results is illustrated by Figure 8.

In Figure 8, elements generally corresponding to those of Figures 6 and 1 are designated with a similar reference numeral and the subscript a.

The modification shown in Figure 8 differs from that of Figure 6 in that a second tube sheet 79a is disposed below the upper sheet 75a, provided with apertures and catalyst feeder tubes 78a dependent therefrom, preferably, in vertical alignment or registry with those of the first sheet. An inert pressuring gas is supplied through line 67a at a pressure slightly higher than that prevailing in the cracking chamber whereby a relatively small and substantially equal amount of the inert gas will pass downwardly through the head of catalyst in each of tubes 78a and upwardly through each of tubes 111a, thereby preventing leakage of hydrocarbon vapors through the catalyst feeding means. Tubes 111a suitably are aligned with tubes 78a and extend a short distance into the latter as shown. However, this arrangement is not essential, and they may be otherwise arranged provided sheets 75a and 79a are suitably vertically spaced to leave a catalyst-free space therebetween for the introduction and even distribution of the inert pressuring gas from inlet 67a through both the upper and lower sets of catalyst feeder tubes 111a and 78a.

Figure 3:
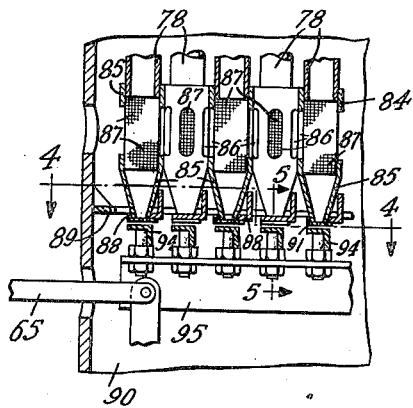
Figure 3 is an enlarged fragmentary view of a detail showing the discharge end of the reaction tubes.
Figure 7:
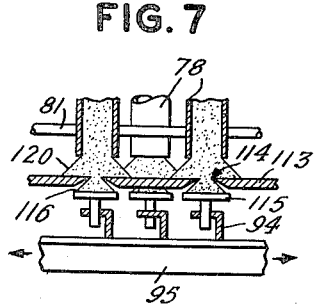
Figure 7 is a sectional view of a modified catalyst discharge assembly.

Figure 7 is a sectional view of a modified form of catalyst discharge mechanism. Instead of the slot and screen mechanism illustrated in Figure 3, tubes 78 extend through tube sheet 81 and terminate a short distance above plate 113 which is provided with orifices 114 immediately beneath the end of each tube. The reciprocating grid formed by members 94 and 95 is provided with discs 115 positioned beneath each orifice 114.

The distance at which the plate 113 is positioned from the lower peripheries of the tubes 78 is an important factor. If the plate 113 is positioned too closely to the lower edges of the tubes 78 there will be a constriction in the flow of vapors passing into the tubes. For uniform results, the surface of each truncated cone 120 of catalytic material should be substantially equal to the cross sectional area of each tube 78. In this way, there will be no increase or decrease in the velocity of flow through the tubes.

It will be observed that plate 113 is provided with a beveled orifice 114 directly beneath each tube 78. The orifice is formed with divergent walls. In place of orifices with divergent walls, the plate 113 may be bored with larger holes and the orifices of proper size formed in the plates mounted below the holes. Such an arrangement produces the proper flow rate and eliminates arching of the catalyst particles in the sides of the orifices. Beneath each orifice 114 is a circular plate 115 adapted to receive the catalytic material passing through respective orifices 114. The angle of the walls of the respective orifices 114 is greater than the angle of repose of the respective piles 116 of catalytic material formed on circular plates 115. Each circular plate 115 is supported by an angle 94. The angles 94 are supported by a pair of cross bars 95, thus forming a grid.

We have found that some of the factors which affect the flow of the catalyst through the tubes are arching of the material in the tubes, the side wall friction of the tubes, the size of the grains of the catalyst material, the shape of the grains of the catalyst material, and the size of the tubes through which the catalyst material flows. In the drawings we have illustrated a chamber in which the tubes 84 have a four inch outside diameter. Using these tubes and passing 500 barrels per day of oil through the apparatus, we have employed a velocity of flow of the catalyst such that one pound of catalyst is employed for each four and a half pounds of oil treated. The length of the tubes was such and the oscillation of the catalyst discharge control grid was such that it required about five hours for a grain of catalyst to pass through a tube 78.

The type of operation obviates the necessity of maintaining a large bed of catalyst which is inevitably attended with considerable crushing of the particles and conseqent deterioration. The apparatus also does away with rotary valves in which the catalyst is ground or crushed by the shearing action of the valve against its body. In other words, metal to metal crushing action is eliminated by the design and character of the feeding and discharging mechanism.

It will be observed that we have accomplished the objects of our invention. We have provided a means for controlling and uniformly and continuously passing catalyst material through a catalyst reaction chamber in such a manner that the flow of catalyst is uniform through all effective parts of the chamber. We have provided means for controlling the velocity of flow and have avoided the necessity of the use of multiple chambers with the attendant disadvantages of progressive loss of effectiveness of the catalyst and progressive drops in yields resulting in the necessity of constantly readjusting operating conditions. By means of our apparatus, we may adjust the temperatures and the rate of catalyst flow to obtain optimum yields and continuously maintain these operating conditions for extended periods of time, thus avoiding the major disadvantage heretofore experienced in catalytic operations.

It will be understood that certain features and sub-combinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

This application is a continuation-in-part of our copending application, Serial No. 343,144, filed June 29, 1940 (now forfeited), which application in turn was a continuation-in-part of our co-pending application Serial No. 227,337, filed August 29, 1938 (now forfeited).

We claim:

1. An apparatus for the continuous catalytic conversion of hydrocarbons by contacting the same with a moving mass of finely divided solid contact material which includes: a reactor housing; a conduit communicating with the top of said housing; a substantially horizontal multi-orificed structure positioned in the upper portion of said housing; a substantially horizontal tube sheet positioned below said structure to form a material distributing zone therebetween; a second substantially horizontal tube sheet below said first tube sheet; tubes extending between said tube sheets; a second multi-orificed structure positioned below said second tube sheet to form a material receiving zone therebetween; a discharge conduit from said reactor housing below said second multi-orificed structure; means positioned beneath said second multi-orificed structure for controlling the flow of material therethrough; a conduit communicating with said distributing zone; and a conduit communicating with said receiving zone.

2. An apparatus as described in claim 1 which includes a housing enclosing said tubes, and means for passing a heat exchange medium through said housing.

3. An apparatus for the continuous catalytic conversion of hydrocarbons by contacting the same with a moving mass of finely divided solid contact material, which apparatus includes: a reactor chamber; a pair of substantially horizontal tube sheets positioned transversely in said chamber; tubes extending between said tube sheets; upper and lower vapor conduits communicating with said chamber above and below said tube sheets respectively; means for introducing said contact material to the upper portion of said chamber, above the uppermost of said tube sheets; a substantially horizontal multi-orificed structure below the lower of said tube sheets; a plurality of closure means positioned below the orifices of said multi-orificed structure and mounted on a reciprocable support; and means for reciprocating said support to move said closure means into and out of vertical alignment with the orifices in said multi-orificed structure.

4. An apparatus for the continuous catalytic conversion of hydrocarbons by contacting the same with a moving mass of finely divided solid contact material, which apparatus includes: a reactor chamber; a substantially horizontal tube sheet positioned transversely in said chamber; tubes depending from said tube sheet; upper and lower vapor conduits communicating with said chamber above and below said tube sheet respectively; means for introducing said contact material to the upper portion of said chamber, above the uppermost of said tube sheets; a substantially horizontal multi-orificed structure below the lower outlets of said tubes; a plurality of closure means positioned below the orifices of said multi-orificed structure and mounted on a moveable support; and means for moving said support to discharge from the top surface of said closure means catalyst flowing thereto through said multi-orificed structure.

5. An apparatus for the continuous catalytic conversion of hydrocarbons by contacting the same with a moving mass of finely divided solid contact material, which comprises: a reactor chamber; a conduit communicating with the top of said chamber; a second conduit communicating with the bottom of said chamber; a horizontal tube sheet positioned in the upper portion of said chamber, tubes depending from the apertures in said tube sheet, a second tube sheet disposed below the first mentioned tube sheet and having the apertures therein in alignment with said depending tubes; additional tubes depending from the apertures in said second tube sheet; said first mentioned tubes depending partially within said additional tubes; a third conduit communicating with the reactor chamber at the level of the space between the tube sheets; a fourth conduit communicating with the reactor adjacent the underside of the second mentioned tube sheet.

WALTER B. MONTGOMERY.
FRANCIS RAPASKY.

REFERENCES CITED

The following references are of record in the file of this patent:

UNITED STATES PATENTS

| Number | Name | Date |
|---|---|---|
| 142,184 | Williams | Aug. 26, 1873 |
| 469,849 | Borgarelli | Mar. 1, 1892 |
| 969,484 | Koegler | Sept. 6, 1910 |
| 1,509,280 | Baker et al. | Sept. 23, 1924 |
| 1,982,099 | Hechenbleikner | Nov. 27, 1934 |
| 2,020,115 | Gray | Nov. 5, 1935 |
| 2,183,301 | Bossner | Dec. 12, 1939 |
| 2,240,347 | Page et al. | Apr. 29, 1941 |
| 2,303,717 | Arveson | Dec. 1, 1942 |
| 2,312,006 | Thiele | Feb. 23, 1943 |
| 2,389,493 | Evans | Nov. 20, 1945 |
| 2,418,672 | Sinclair | Apr. 8, 1947 |

FOREIGN PATENTS

| Number | Country | Date |
|---|---|---|
| 731,143 | France | May 24, 1932 |